Nov. 17, 1936.　　　J. H. MOSEL　　　2,061,327
CART
Filed Jan. 27, 1936　　　2 Sheets-Sheet 1

INVENTOR.
Joseph H. Mosel.
BY
ATTORNEYS.

Nov. 17, 1936.    J. H. MOSEL    2,061,327
CART
Filed Jan. 27, 1936    2 Sheets-Sheet 2

INVENTOR.
Joseph H. Mosel
BY Cotedt & Mahoney
ATTORNEYS.

Patented Nov. 17, 1936

2,061,327

UNITED STATES PATENT OFFICE 2,061,327

CART

Joseph H. Mosel, Columbus, Ohio, assignor to The Jaeger Machine Company, Columbus, Ohio, a corporation of Ohio Application January 27, 1936, Serial No. 60,920

2 Claims. (Cl. 298—2)

My invention relates to a cart. It has to do more particularly with that type of cart commonly used for transporting concrete from a mixer or other source of supply to a point where it is to be poured into forms or to be used in other ways. However, my invention is not necessarily limited to a cart for transporting concrete or similar material.

The most common type of concrete cart now in use comprises a body portion or container carried by a pair of large steel wheels in such a manner that it may pivot about the axle of such wheels in order to be dumped. The wheels and the body portion are of such relative sizes and so arranged that the body portion may be tilted about the axle of the wheels until its forward and upper edge strikes the ground and the entire cart may then be tilted further forwardly in an easy manner by one man, using the edge which contacts with the ground as a fulcrum point, in order to complete the dumping operation.

Recently there has been a demand for concrete carts of this general type which are provided with pneumatic tires. One type of concrete cart having pneumatic tires has been manufactured and sold. Because of the fact that it is necessary to use standard size pneumatic tires, it has been necessary to use wheels which are much smaller than the steel wheels previously used on concrete carts. It is also necessary to use the standard size container or body portion of the cart. Consequently, the concrete cart which has been provided with pneumatic tires has a body portion or container of standard size but has wheels which are much smaller than the large steel wheels used previously. The result is that the axle of the wheels is located at a very low point relative to the container or body portion of the cart so that the body portion will pivot about a very low point. Consequently, in dumping this cart it is impossible to swing the body portion around the axle until its forward and upper edge strikes the ground and it is impossible for one man, due to the position of the center of gravity, to complete the dumping action by tilting the entire cart further forwardly until the concrete will slide out of the cart. With this type of cart, it has been necessary to use a hoe or other implement to scrape the concrete from the cart.

One of the objects of my invention is to provide a concrete cart which has a standard size container or body portion and which is provided with comparatively small wheels of such a type that standard size pneumatic tires may be mounted thereon.

Another object of my invention is to provide a concrete cart of the type indicated, having pneumatic tires, which is so constructed that the cart may be dumped in a more efficient manner than concrete carts having the large steel wheels.

Other objects will be apparent as this description progresses.

In its preferred form, my invention contemplates the provision of a concrete cart having a container or body portion of standard size which is mounted on wheels of much smaller size than the large steel wheels used in the past so that standard size pneumatic tires may be used on the wheels. However, in order that the cart may be dumped as efficiently as prior art concrete carts provided with the large steel wheels, two sets of pivot points are provided about which the body portion of the cart may swing. One set of pivot points comprises the axles of the wheels which are located at a relatively low point and about which the body portion of the cart may pivot during the time the cart is being used for transporting material from place to place. The other set of pivots are located at a comparatively high point relative to the body portion and the body portion is adapted to swing about such pivots during the dumping operation. These latter pivots are so arranged that the body portion of the cart may be tilted forwardly about such pivots until its forward and upper edge strikes the ground and then the entire cart may be easily tilted further forwardly by one man, because of the location of the center of gravity, in order to complete the dumping operation and without the necessity of scraping the concrete from the cart.

The preferred embodiment of my invention is illustrated in the accompanying drawings wherein similar characters of reference designate corresponding parts and wherein.

Figure 1:
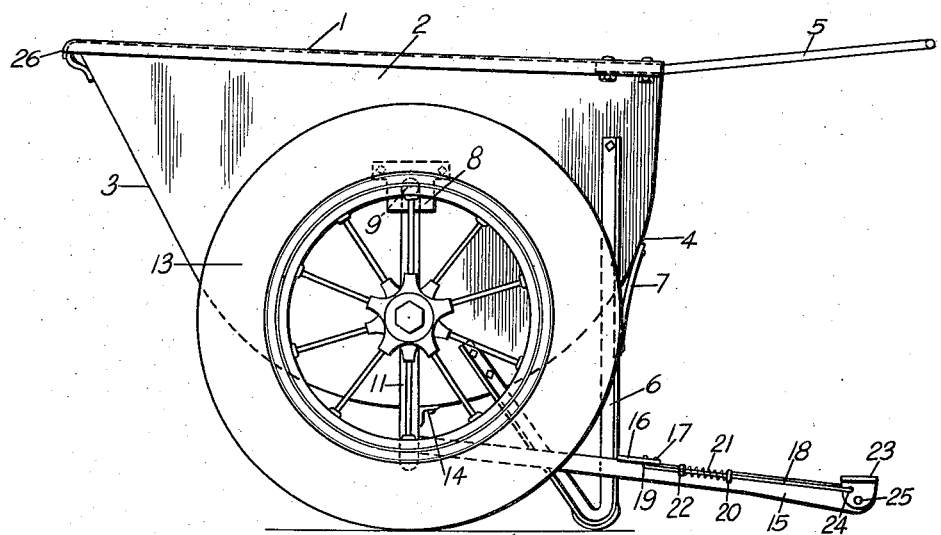
Figure 1 is a side elevation of a concrete cart constructed in accordance with the principles of my invention.
Figure 2:
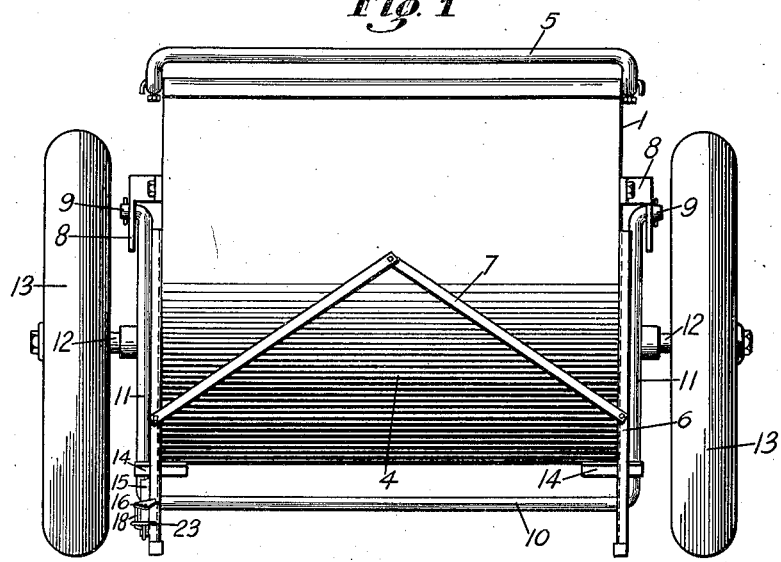
Figure 2 is a rear elevation of the structure illustrated in Figure 1.
Figure 6:
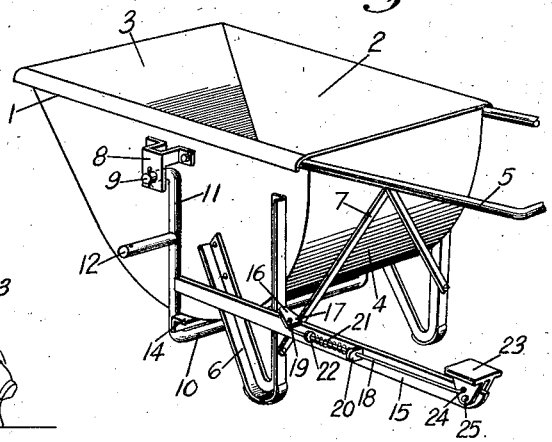
Figure 6 is a perspective view of the cart showing it with the wheels removed.

With reference to the drawings and particularly to Figures 1, 2, and 6, I illustrate my concrete cart as comprising a container or body portion 1 of the usual type and of standard size. This body portion or container has straight vertically disposed side walls 2, an inclined forward wall 3 and a continuously curved rear and bottom wall 4. The top is open as indicated. The body portion 1 is provided with a rearwardly extending handle member 5 in the usual manner. It is also provided with a pair of depending V-shaped leg members 6 which are fastened thereto and which are braced by transversely extending members 7 arranged as indicated.

At each side of the body portion 1 a bracket member 8 is fastened to the side wall 2. Each bracket member 8 has a depending portion provided with an opening which receives a horizonally disposed portion 9 formed on the upper end of a U-shaped member 10. This U-shaped member 10 extends beneath the body portion 1 and vertically at each side thereof to the point where it is pivotally connected to the body portion 1 by means of the brackets 8. Intermediate the upper and lower ends of each of the vertically extending portions 11 of member 10 a spindle member 12 projects outwardly therefrom. The pair of spindle members 12 is adapted to receive a pair of wheels 13 which are of the automobile type having pneumatic tires and are mounted on the spindles by antifriction bearings in the usual manner. It will be apparent that the body portion of the cart will be supported on the wheels 13 so that it may be transported from place to place. The legs 6 are of such length that they contact with the ground to prevent rearward pivoting of the body portion of the cart on the wheels when the cart is being loaded or is not in use, as indicated in Figure 1.

On the bottom of the container or body portion 1 a pair of stops 14 are provided. These stops are arranged behind the vertical portion 11 of member 10 and project laterally from the portion 1 in such a manner that the member 10 will contact therewith. These stops 14 serve to prevent rearward swinging of member 10 relative to the body portion 1 about the pivot point 9. One of the vertical portions 11 of the member 10 is provided with a rearwardly projecting arm 15 which has its forward end integrally secured to the member 10. This arm is provided with latch mechanism which is adapted to cooperate with the adjacent leg 6 to prevent forward swinging of the member 10 about the pivot point 9 and relative to the body portion 1.

This latch mechanism comprises a latch member 16 which is pivoted at 17 for movement to a position behind the leg 6 or to a lateral position where it will not interfere with rearward movement of the leg 6. A rod 18 is pivoted to member 16 as at 19. This rod is slidably mounted in a lug 20 projecting laterally from the side surface of the arm 15. In front of the lug 20 a compression spring 21 is disposed. The rear end of this spring abuts the lug 20 while its forward end abuts a collar 22 secured to rod 18. The rear end of the rod 18 is pivoted to a pedal member 23 as at 24 and the pedal member is pivoted to the rear end of the arm 15 as at 25. It will be apparent that the operator may step on the pedal 23 and by properly manipulating it will cause the latch member 16 to swing out of engagement with the leg member 6. The latch member 16 normally tends to stay in the position indicated in Figure 6 because of the spring 21.

It will be apparent that with this structure two different sets of pivot points are provided. The container or body portion 1 of the cart is pivoted to the member 10 at the points 9 which is at a comparatively high point relative to the container 1. The wheels 13, however, are mounted on the spindles 12 which are arranged a substantial distance below the pivot points 9. Consequently, it is possible to use much smaller wheels than the large steel wheels previously used in concrete carts of this type. As will be explained more in detail hereinafter, the body portion or container 1 swings about the pivot points 9 during the dumping operation. Since these pivot points 9 are comparatively high, dumping is facilitated.

When the cart is being filled or is not being used, the various members are in the positions indicated in Figure 1. The lower ends of the legs 6 will be in contact with the ground while the rear end of the arm 15 will be out of contact with the ground. The stop members 14 will prevent rearward swinging of the member 10 relative to the body portion or container of the cart while the latch 16 will prevent forward swinging of the member 10 relative to the body portion or container.

Figure 3:
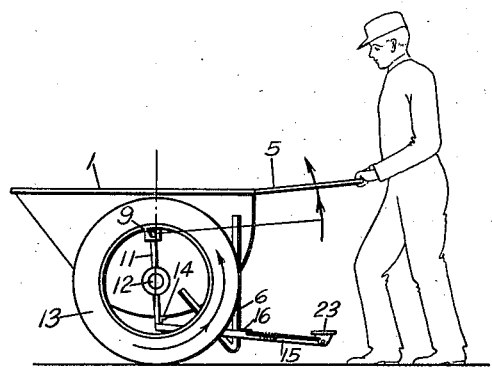
Figure 3 is a more or less diagrammatic view illustrating the cart being wheeled along.

When the cart is filled with material to be transported, the operator merely pulls up on the rear end of handle 5, as indicated in Figure 3 to raise the legs 6 out of contact with the ground. This causes the body portion of the cart to pivot about the pivot points 12. Pivoting of the body portion of the cart about the pivot points 9 is normally prevented by means of the stops 14 and the latch 16. The pivot points 9 are arranged substantially at the center of gravity of the container or body portion of the cart. The pivot points 12 for the wheels are arranged so that the weight of the cart and the material contained therein will be substantially balanced during transporting of the material. It will be noted from Figure 3 that the pivot points 9 which are arranged substantially at the center of gravity are slightly forward of the pivot points 12. Furthermore, during transportation, the body portion of the cart pivots about the points 12. Consequently, this will tend to cause the member 10 to swing about the pivot points 12 in such a manner that its upper end will swing forwardly and its lower end rearwardly. Consequently, the strain caused by the weight of the material and the body portion of the cart will be concentrated on the stop members 14 rather than on the latch member 17. It will be apparent that the stop members 14 may more readily withstand the force than the latch member 16.

Figure 4:
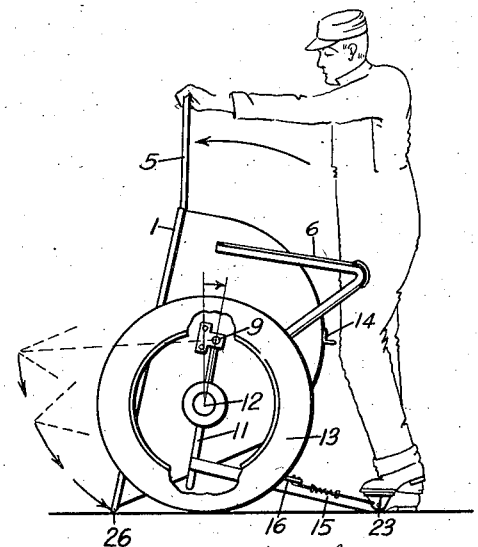
Figure 4 is a similar view but illustrating the first step in the dumping operation.

When the point where the material is to be dumped is reached, the cart is rested on the legs 6 and the operator then releases the latch 16 by means of the pedal 23. This permits swinging of the member 10 about the pivot points 12 until the rear end of the arm 15 contacts with the ground, as indicated in Figure 4. The body portion of the cart may then be swung upwardly and forwardly around the pivot points 9 as indicated in Figure 4. During this operation, the operator keeps his foot on the pedal 23 so that the rear end of the arm 15 will be held in firm contact with the ground which will produce a braking action that will prevent forward rolling movement of the cart during the dumping operation. When the latch is released and the member 10 is swung about the pivot points 12 until the rear end of the arm 15 contacts with the ground, the center of gravity is shifted rearwardly, as indicated diagrammatically in Figure 4, inasmuch as the upper end of member 11 is moved rearwardly. Consequently, during this initial dumping operation, the weight of the cart and the material therein will exert its force at the rear end of the arm 15 tending to keep it firmly in contact with the ground. The container or body portion of the cart may be tilted about the pivot points 9 until its upper and forward edge 26 contacts with the ground as indicated in Figure 4.

Figure 5:
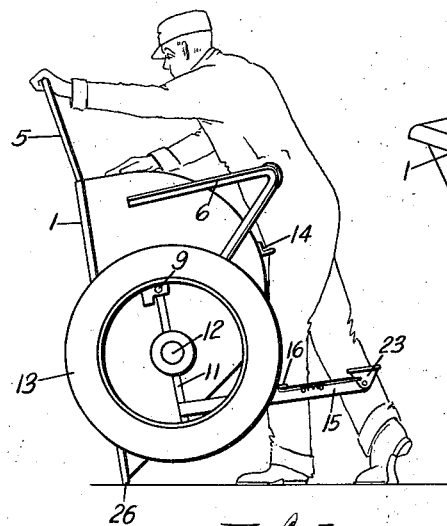
Figure 5 is a similar view but illustrating the final step in the dumping operation.

The dumping operation may then be completed as illustrated in Figure 5. The edge 26 of the body portion 1 is then used as a fulcrum point and the entire cart is tipped further forwardly as indicated. This will cause the material in the cart to slide therefrom and it will not be necessary to scrape it out with some tool. One man can readily tip the entire cart over as indicated in Figure 5 because of the fact that the body portion of the cart may be swung around the pivot points 9, as indicated in Figure 4, until the edge 26 contacts the ground which will be at a point spaced slightly forward of the center of gravity of the cart which is substantially at the point 9. Because the center of gravity is so disposed at this time relative to the fulcrum point 26 it will not require very much force to tilt the entire cart forwardly in the manner indicated in Figure 5.

When the cart has been dumped in this manner, it may then be tilted rearwardly until the wheels 13 strike the ground. Then the body portion or container 1 will be tilted rearwardly about the pivot points 9 until the latch 16 snaps behind the leg 6 and the lower end of member 10 contacts with the stops 14. Thereafter, the body portion of the cart will only pivot around the axes of the spindles 12.

It will be apparent from the above description that I have provided a concrete cart having many desirable features. It is so constructed that the container or body portion may be of standard size and it may be provided with small wheels so that pneumatic tires of standard sizes and lower cost may be used thereon. The cart may be dumped as efficiently or even more efficiently than prior art concrete carts provided with the large steel wheels since two sets of pivot points are provided about which the body portion of the cart may swing, one set of pivot points comprising the axles or spindles of the wheels which are located at a relatively low point and about which the body portion of the cart may pivot during the time the cart is being used for transporting material and the other set of pivots being located at a comparatively high point relative to the body portion which is adapted to swing about such pivot points during the dumping operation. These latter pivots are so arranged that the body portion of the cart may be tilted forwardly about such pivots until its forward and upper edge strikes the ground and then the entire cart may be easily tilted further forwardly by one man, because of the location of the center of gravity, in order to complete the dumping operation without the necessity of scraping the concrete from the cart.

It will be apparent that although in this description I have described the cart as being provided with wheels having pneumatic tires, my invention is not limited thereto. With the structure which I have disclosed, it is possible to use smaller wheels whether they have pneumatic tires or not while still maintaining the efficiency of the cart especially in regard to the dumping thereof.

Having thus described my invention, what I claim is:

1. A cart of the type described comprising a body portion, a substantially U-shaped member extending beneath the body portion and upwardly at opposite sides thereof, said U-shaped member having its upper end pivotally connected to said body portion, each of the vertical portions of said U-shaped member carrying a spindle which is spaced below the point at which said portion of the U-shaped member is pivotally connected to said body portion, each of said spindles carrying a wheel which supports the body portion for transportation, a rearwardly extending arm rigidly secured to said U-shaped member adjacent the lower portion thereof, stop members adjacent the bottom of said body portion for contacting with said U-shaped member to limit rearward swinging thereof relative to the body portion about the points where it is pivotally connected thereto, leg members secured to the rear portion of said body portion, one of said leg members being disposed adjacent the rearwardly extending arm member, and a latch carried by said arm member for cooperating with said leg member to prevent forward swinging of said U-shaped member relative to said body portion about the points where it is pivotally connected thereto.

2. A cart of the type described comprising a body portion, a substantially U-shaped member extending beneath the body portion and upwardly at opposite sides thereof, said U-shaped member having its upper ends pivotally connected to said body portion, each of said vertical portions of said U-shaped member carrying a spindle which is spaced below the point at which said portion of the U-shaped member is pivotally connected to said body portion, each of said spindles carrying a wheel which supports the body portion for transportation, a rearwardly extending arm rigidly secured to said U-shaped member adjacent the lower portion thereof, stop members adjacent the bottom of said body portion for contacting with said U-shaped members to limit rearward swinging thereof relative to the body portion about the points where it is pivotally connected thereto, leg members secured to the rear portion of said body portion, one of said leg members being disposed adjacent the rearwardly extending arm member, a latch carried by said arm member for cooperating with said leg member to prevent forward swinging of said U-shaped member relative to said body portion about the points where it is pivotally connected thereto, and foot-pedal-operated mechanism carried by said arm for releasing said latch.

JOSEPH H. MOSEL.